(12) United States Patent
Huang et al.

(10) Patent No.: US 8,565,192 B2
(45) Date of Patent: Oct. 22, 2013

(54) METHOD FOR SWITCHING RADIO RESOURCE CONTROL STATE, BASE STATION, AND USER EQUIPMENT

(75) Inventors: Lei Huang, Shanghai (CN); Renmao Liu, Shanghai (CN); Yongming Liang, Shanghai (CN); Ming Ding, Shanghai (CN); Chen Chen, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 503 days.

(21) Appl. No.: 12/933,615

(22) PCT Filed: Mar. 19, 2009

(86) PCT No.: PCT/JP2009/055404
§ 371 (c)(1),
(2), (4) Date: Sep. 20, 2010

(87) PCT Pub. No.: WO2009/116614
PCT Pub. Date: Sep. 24, 2009

(65) Prior Publication Data
US 2011/0019648 A1  Jan. 27, 2011

(30) Foreign Application Priority Data

Mar. 21, 2008  (CN) .......................... 2008 1 0084422

(51) Int. Cl.
*H04W 4/00* (2009.01)
*H04M 11/00* (2006.01)
(52) U.S. Cl.
USPC .......................................... 370/332; 455/405
(58) Field of Classification Search
None
See application file for complete search history.

(56) References Cited

U.S. PATENT DOCUMENTS

| 2004/0142706 | A1* | 7/2004 | Kim et al. ...................... 455/458 |
| 2005/0083913 | A1* | 4/2005 | Choi et al. ..................... 370/352 |
| 2007/0015515 | A1* | 1/2007 | Matsuda ..................... 455/456.1 |

OTHER PUBLICATIONS

3GPP TS 36.300 V8.2.0, E-UTRA and E-UTRAN Overall description, stage 2 (Release 8), pp. 57-63.
Ericsson, 3GPP TSG-RAN WG2 #60, "MBMS reception state for single-cell transmission", R2-074709.
Ericsson, et al., 3GPP TSG-RAN WG2#60, "Summary of discussion on MBMS reception states for SC-PTm transmission", R2-075455.

(Continued)

*Primary Examiner* — Eunsook Choi
(74) *Attorney, Agent, or Firm* — Birch, Stewart, Kolasch & Birch, LLP (57) ABSTRACT

The present invention provides: a method for switching an RRC state; an eNB; and a UE. The eNB (104) of the present invention includes: a sending/receiving unit (1040) for carrying out data communication with one or more MBMS•UEs in a cell; a calculation unit (1042) for calculating the number of RRC connections currently available in a system; an execution determination unit (1044) for determining whether or not a switchover of an RRC state of the one or more MBMS•UEs is necessary, on the basis of the number of RRC connections currently available in the system and a threshold value of the number of RRC connections; a request unit (1046) for transmitting, via the sending/receiving unit (1040), a measurement report request to all of the one or more MBMS•UEs in the cell, in a case where the execution determination unit (1044) determines that the switchover of the RRC state of the MBMS• UE(s) is necessary; and an accurate value determination unit (1048) for (i) determining an accurate reference measurement threshold value with respect to a parameter on the basis of the threshold value of the number of the RRC connections and data of a measured parameter, received via the sending/receiving unit (1040) from each of the one or more MBMS•UEs, and (ii) transmitting, via the sending/receiving unit (1040), the accurate reference measurement threshold value to all of the one or more MBMS•UEs in the cell.

13 Claims, 4 Drawing Sheets

(56) References Cited

OTHER PUBLICATIONS

International Search Report PCT/JP2009/055404 dated May 19, 2009.

Nokia, Nokia Siemens Networks, 3GPP TSG-RAN WG2 Meeting #58bis, "Issues identified with MBMS_RRC_CONNECTED state", R2-072411.

Siemens, 3GPP TSG-RAN WG2 Ad-hoc on LTE, "Transition from Active to Idle", R2-061937.

* cited by examiner

METHOD FOR SWITCHING RADIO RESOURCE CONTROL STATE, BASE STATION, AND USER EQUIPMENT

TECHNICAL FIELD

The present invention relates to a field of a mobile communication technique. The present invention relates to, particularly, a method for switching a radio resource control (RRC) state, a base station, a user equipment, more particularly, to a technique for switching the radio resource control state in a multimedia broadcast multicast service (MBMS) mode of a communication system.

BACKGROUND ART

Figure 1:
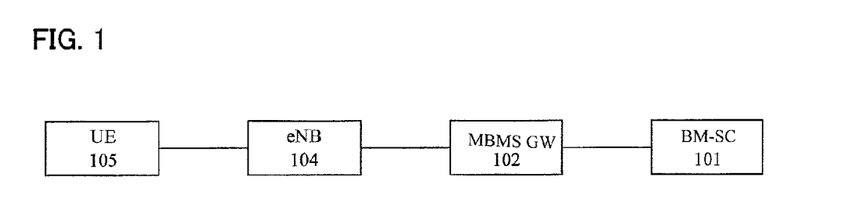
FIG. 1 is a block diagram illustrating an MBMS system defined by LTE.

FIG. 1 is a view illustrating an arrangement of a Multimedia Broadcast Multicast Service (hereinafter, referred to as "MBMS") system defined by Long Term Evolution (hereinafter, referred to as "LTE") of a mobile communication system. The following description deals with the arrangement of the MBMS system.

The MBMS system includes: an Evolved Broadcast Multicast Service Center (hereinafter, referred to as "BM-SC") 101; an Evolved Broadcast Multicast Gateway (hereinafter, referred to as "MBMS GW") 102; an Evolved Node Base station (hereinafter, referred to as "eNB") 104, and a user equipment (hereinafter, referred to as "UE") 105. The BM-SC 101 is a service control center of the MBMS system. The MBMS GW 102 employs the IP multicast method so as to carry out synchronization of timing of MBMS data transmission and transmit the MBMS data to corresponding eNBs 104. The eNB 104 manages scheduling of resources (radio resources) for single-cell MBMS transmission, and carries out MBMS data transmission. The UE 105 is a terminal device for receiving the MBMS data.

Currently, problems related to MBMS defined by LTE have been shared to a certain degree, and described in documents of 3GPP. In 3GPP TS 36.300 (E-UTRA and E-UTRAN Overall description, stage 2, v8.2.0), two basic MBMS transmission modes are defined.

One is a single-cell transmission mode (SC-PTM), in which MBMS only covers a specific cell. According to the single-cell transmission mode, the UE cannot combine radio signals transmitted from multiple cells, with each other. Accordingly, the UE in the specific cell cannot enhance the target radio signal.

Another is a multi-cell transmission mode (MBSFN), in which the UE can receive radio signals of MBMS, simultaneously transmitted from multiple cells, and can combine these radio signals with each other. This can improve reliability in reception of MBMS signals. Further, 3GPP TS 36.300 also describes MBMS reception states. The UE using MBMS can be in an RRC connected state or an RRC idle state. Which one of the MBMS reception states is set is determined by a unicast service connection state of the UE. In a case where the UE using MBMS takes part in a feedback mechanism, the UE must be in the RRC connected state.

At the 60th meeting of 3GPP TSG RAN2, held in Cheju in South Korea on Nov. 5-9, 2007, "R2-075455 (summary of discussion on MBMS reception states for SC-PTM transmission)" was proposed by companies, such as Ericsson, ETRI, and LG Electronics. This proposition reached an agreement on the reception state of the UE receiving MBMS in the single-cell transmission mode.

According to the proposition, the UE employing the single-cell MBMS transmission mode can be either in the RRC connected (RRC_CONNECTED) state or in the RRC idle (RRC_IDLE) state. The base station can request the UE employing the single-cell MBMS mode to turn to the RRC_CONNECTED state regardless of whether or not the UE is receiving a unicast service (Unicast) which supports point-to-point transmission.

Further, Ericsson proposed, in the "R2-074709 (MBMS reception state for single-cell transmission)" presented at the meeting, such a technique that the single-cell MBMS transmission is carried out only on a downlink shared channel (DL_SCH), while all of the UEs receiving MBMS are turned to the RRC_CONNECTED state. The proposition is based on a premise that there are not so many UEs receiving MBMS in the single cell. In a case where the UE receiving MBMS is turned to the RRC connected state, there are advantages in system management for the UE receiving MBMS, e.g. simplification of a mobility management process of the MBMS system, and simplification of an identification process for the UE receiving MBMS. Further, the UE receiving MBMS feeds back information on a current uplink in the unicast system, and the system optimizes a parameter for the MBMS transmission with the use of information thus fed back. Thus, the quality of MBNS can be improved. Note, however, that a large number of RRC connections cause much signaling (command) overhead of the system, and reduce resource utilization. Further, there is a limitation in the number of RRC connections available in the system. For this reason, in a case where resources of the RRC connections are occupied by a great number of the UEs receiving MBMS, the UE receiving the unicast service cannot make a connection with the system. Furthermore, due to the limitation in the number of RRC connections available in the system, there is a problem that, in a case where, for example, all of the UEs receiving MBMS in the single-cell transmission mode are turned to the RRC connected state, a maximum number of the UEs acceptable in the cell may equal to the number of RRC connections available in the system. This may reduce MBMS utilization, i.e. the number of UEs receiving MBMS is unnecessarily limited.

However, in light of current development in this technical field, it seems that MBMS will be increasingly demanded on the market, and the number of UEs receiving MBMS is expected to increase rapidly. Accordingly, it seems that the aforementioned problem will become more serious.

CITATION LIST

Non-patent Literature 1

3GPP TS 36.300 (E-UTRA and E-UTRAN Overall description, stage 2, v8.2.0)

Non-patent Literature 2

R2-075455 (Summary of discussion on MBMS reception states for SC-PTM transmission) proposition, 3GPP TSG RAN2, the 60th meeting, November 2007.

SUMMARY OF INVENTION

The present invention is made in view of the problem. In order to enable the UEs being in the RRC idle state to receive MBMS within the current MBMS definition of LTE, the present invention provides a specific implementation method and implementation equipment for switching the RRC state in the MBMS transmission mode on the basis of the Ericsson's proposition in R2-074709 to maintain all of the UEs in the cell to be in the RRC connected state on the premise that there are not many UEs receiving MBMS in the cell.

That is, the present invention is made in order to solve the problem that occupation of the RRC connection resources by the UEs receiving MBMS in the MBMS transmission mode causes significant signaling overhead, which prevents a normal connection of the UE receiving the unicast service and therefore reduces (frequency) resource utilization.

In the present invention, the UE receiving MBMS is a user equipment which does not receive the unicast service but MBMS. Further, in the present invention, the base station, the evolved Node B, base station equipment, and eNB mean the same equipment.

In order to attain the object, the present invention provides a method and equipment either of which is applicable to a mobile communication system. By providing these, the present invention allows an appropriate switchover of the RRC state of the UE which receives MBMS in the MBMS transmission mode in the cell. Particularly, in a case where a predetermined condition is satisfied, the present invention can provide a mechanism in which the base station switches, by a signaling method, the RRC state of the UE which receives MBMS in the cell. The signaling method is specifically determined by a parameter provided in the base station of the cell.

In order to attain the object, a base station of the present invention includes: a sending/receiving unit for carrying out data communication with one or more user equipments in a cell, the one or more user equipments receiving Multimedia Broadcast Multicast Service; a calculation unit for calculating the number of radio resource control connections currently available in a system; an execution determination unit for determining whether or not a switchover of a radio resource control state of a user equipment(s) among the one or more user equipments is necessary, on the basis of the number of radio resource control connections currently available in the system and a threshold value of the number of radio resource control connections; a request unit for transmitting, via the sending/receiving unit, a request to report measurement of a first parameter to all of the one or more user equipments in the cell, in a case where the execution determination unit determines that the switchover of the radio resource control state of the user equipment(s) is necessary; an accurate value determination unit for (i) determining an accurate reference measurement threshold value with respect to the first parameter on the basis of the threshold value of the number of radio resource control connections and data of the measured first parameter, received from each of the one or more user equipments via the sending/receiving unit, and (ii) transmitting, via the sending/receiving unit, the accurate reference measurement threshold value to all of the one or more user equipments in the cell.

Note that the "accurate reference measurement threshold value" has higher accuracy than that of the "approximate reference measurement threshold value". Therefore, the "accurate reference measurement threshold value" can be referred to as a "detailed reference measurement threshold value".

Further, the base station of the present invention preferably further includes an approximate value determination unit for determining an approximate reference measurement threshold value with respect to a second parameter on the basis of statistical data or a parameter of a static system, the request unit transmitting, via the sending/receiving unit, the approximate reference measurement threshold value to all of the one or more user equipments in the cell.

Furthermore, in the base station of the present invention, either the first parameter or the second parameter preferably includes at least one of a reference signal received power, a channel quality indicator, and a path-loss.

Moreover, in the base station of the present invention, the second parameter to which the approximate reference measurement threshold value is determined by the approximate value determination unit and the first parameter to which the accurate reference measurement threshold value is determined by the accurate value determination unit are preferably identical with each other.

Further, in the base station of the present invention, the second parameter to which the approximate reference measurement threshold value is determined by the approximate value determination unit and the first parameter to which the accurate reference measurement threshold value is determined by the accurate value determination unit are preferably different from each other, the approximate reference measurement threshold value and the accurate reference measurement threshold value being determined independently.

Furthermore, in the base station of the present invention, the calculation unit preferably calculates the number $N_a = N_{max} - N_c$ of radio resource control connections currently available in the system, on the basis of the number $N_c$ of radio resource control connections currently established in the system and a maximum number $N_{max}$ of radio resource control connections available in the system.

Furthermore, in the base station of the present invention, a threshold value $N_{th}$ of the number of radio resource control connections is preferably set by the execution determination unit previously or dynamically, and in a case where the number $N_a$ of radio resource control connections currently available in the system is less than the threshold value $N_{th}$ of the number of radio resource control connections, the execution determination unit preferably determines that the switchover of the radio resource control state of the user equipment(s) is necessary.

Moreover, the base station of the present invention preferably further includes a releasing unit for, in a case where the base station receives, via the sending/receiving unit, a request for a radio resource control connection from a user equipment among the one or more user equipments, (i) transmitting releasing information of the radio resource control connection to the user equipment from which the request for the radio resource control connection is received, and simultaneously (ii) temporarily establishing a radio resource control connection with the user equipment, and releasing the radio resource control connection with the user equipment.

Further, in the base station of the present invention, in a case where the execution determination unit determines that the switchover of the radio resource control state of the user equipment(s) is not necessary, the execution determination unit preferably causes the calculation unit to be restarted after a predetermined period of time elapses.

Moreover, the base station of the present invention preferably further includes a session determination unit for determining whether or not a session of Multimedia Broadcast Multicast Service is finished, the session determination unit causing the calculation unit to be restarted after a predetermined period of time elapses, in a case where the session determination unit determines that the session of Multimedia Broadcast Multicast Service has not been finished.

In order to attain the object, a user equipment of the present invention includes: a sending/receiving unit for carrying out data communication with a base station in a cell to which the user equipment belongs; a reporting unit for (i) measuring a first parameter of the user equipment in response to a request to report measurement of the first parameter, which request is received from the base station via the sending/receiving unit, and (ii) reporting, to the base station via the sending/receiving unit, data of the first parameter thus measured; and a start-up determination unit for determining whether to switch over a radio resource control state of the user equipment, on the basis of (a) an accurate reference measurement threshold value determined with respect to the first parameter, received from the base station via the sending/receiving unit, (b) a value of the first parameter of the user equipment, measured by the reporting unit, and (c) the radio resource control state of the user equipment.

Further, in the user equipment of the present invention, the reporting unit preferably determines whether to report, to the base station, the data of the first parameter measured by the reporting unit, on the basis of (a) an approximate reference measurement threshold value determined with respect to a second parameter, received from the base station via the sending/receiving unit and (b) a value of the second parameter of the user equipment, measured by the reporting unit.

Furthermore, in the user equipment of the present invention, either the first parameter or the second parameter preferably includes at least one of a reference signal received power, a channel quality indicator, and a path-loss.

Moreover, in the user equipment of the present invention, the first parameter to which the accurate reference measurement threshold value is determined and the second parameter to which the approximate reference measurement threshold value is determined are preferably identical with each other.

Further, in the user equipment of the present invention, the first parameter to which the accurate reference measurement threshold value is determined and the second parameter to which the approximate reference measurement threshold value is determined are preferably different from each other, the accurate reference measurement threshold value and the approximate reference measurement threshold value being determined independently.

Furthermore, the user equipment of the present invention preferably further includes a state checking unit for checking which one of a radio resource control connected state and a radio resource control idle state the user equipment is being in, the reporting unit reporting, to the base station, the data of the first parameter thus measured in response to the request to report measurement of the first parameter in a case where the state checking unit confirms that the user equipment is being in the radio resource control connected state, and the reporting unit transmitting, to the base station via the sending/receiving unit, a random connection request in response to the request to report measurement of the first parameter in a case where the state checking unit confirms that the user equipment is being in the radio resource control idle state, and the reporting unit reporting, to the base station via the sending/receiving unit, by use of a radio resource control connection establishment request, the data of the first parameter thus measured, in a case where the reporting unit receives, via the sending/receiving unit, a random connection response.

In order to attain the object, a method of the present invention, for switching a radio resource control (RRC) state, includes the steps of: (I) calculating the number of radio resource control connections currently available in a system; (II) determining, on the basis of the number of radio resource control connections currently available in the system and a threshold value of radio resource control connections, whether or not a switchover of a radio resource control state of a user equipment(s) among one or more user equipments in a cell is necessary, which one or more user equipments receive Multimedia Broadcast Multicast Service; (III) transmitting a request to report measurement of a first parameter to all of the one or more user equipments in a cell, in a case where it is determined that the switchover of the radio resource control state of the user equipment(s) is necessary; (IV) each of the one or more user equipments measuring the first parameter of that user equipment in response to the request to report measurement of the first parameter which is thus received and reporting data of the first parameter thus measured; (V) determining an accurate reference measurement threshold value with respect to the first parameter on the basis of the threshold value of radio resource control connections and the data of the first parameter thus reported, and transmitting the accurate reference measurement threshold value to all of the one or more user equipments in the cell; and (VI) each of the one or more user equipments determining whether to carry out a switchover of a radio resource control state of that user equipment on the basis of (a) the accurate reference measurement threshold value determined with respect to the first parameter, transmitted in the step of (V), (b) a value of the first parameter of that user equipment, measured in the step of (IV), and (c) a radio resource control state of that user equipment.

Further, the method of the present invention, for switching an RRC state, preferably further includes the step of (VII) determining an approximate reference measurement threshold value with respect to a second parameter on the basis of statistical data or a parameter of a static system, the step of (III) including transmitting the approximate reference measurement threshold value to all of the one or more user equipments, the step of (IV) including each of the one or more user equipments determining whether to report the data of the first parameter measured in the step of (IV), on the basis of (a) the approximate reference measurement threshold value transmitted to said all of the one or more user equipments, and (b) a value of the second parameter of that user equipment, measured in the step of (IV).

Furthermore, in the method of the present invention, for switching an RRC state, either the first parameter or the second parameter preferably includes at least one of a reference signal received power, a channel quality indicator, and a path-loss.

Moreover, in the method of the present invention, for switching an RRC state, the first parameter to which the accurate reference measurement threshold value is determined in the step of (V) and the second parameter to which the approximate reference measurement threshold value is determined in the step of (VII) are preferably identical with each other.

Further, in the method of the present invention, for switching an RRC state, the first parameter to which the accurate reference measurement threshold value is determined in the step of (V) and the second parameter to which the approximate reference measurement threshold value is determined in the step of (VII) are preferably different from each other, the accurate reference measurement threshold value and the approximate reference measurement threshold value being determined independently.

Furthermore, in the method of the present invention, for switching over a RRC state, in the step of (I), the number $N_a=N_{max}-N_c$ of radio resource control connections currently available in the system is preferably calculated on the basis of the number $N_c$ of radio resource control connections currently established in the system and the maximum number $N_{max}$ of radio resource control connections available in the system.

Moreover, in the method of the present invention, for switching an RRC state, the threshold value $N_{th}$ of radio resource control connections is preferably set previously or dynamically, and in a case where the number $N_a$ of radio resource control connections currently available in the system is less than the threshold value $N_{th}$ of radio resource connections, it is determined that the switchover of the radio resource control state of the user equipment(s) is necessary.

Further, in the method of the present invention, for switching an RRC state, in the step of (IV), a user equipment being in a radio resource control connected state among the one or more user equipments preferably directly reports the data of the first parameter thus measured, in response to the request to report measurement of the first parameter.

Furthermore, in the method of the present invention, for switching an RRC state, in the step of (IV), a user equipment being in a radio resource control idle state among the one or more user equipments preferably transmits a random connection request in response to the request to report measurement of the first parameter; and in a case where that user equipment receives a random connection response, that user equipment preferably reports the data of the first parameter thus measured, by use of a radio resource control connection establishment request.

Moreover, the method of the present invention, for switching an RRC state, preferably further includes the step of: (VIII) after receiving the radio resource control connection establishment request from the user equipment, (i) transmitting releasing information of a radio resource control connection to the user equipment and simultaneously (ii) temporarily establishing a resource of a radio resource control connection with the user equipment and releasing the resource of the radio resource control connection with the user equipment.

Further, in the method of the present invention, for switching an RRC state, in a case where it is determined, in the step of (II), that the switchover of the radio resource control connection of the user equipment(s) is not necessary, the step of (I) is preferably restarted after a predetermined period of time elapses.

Furthermore, the method of the present invention, for switching an RRC state, preferably further includes (IX) determining whether or not a session of Multimedia Broadcast Multicast Service has been finished, the step of (I) being restarted after a predetermined period of time elapses, in a case where it is determined, in the step of (IX), that the session of Multimedia Broadcast Multicast Service has not been finished.

In order to attain the object, a method of the present invention, for switching an radio resource control (RRC) state, includes the steps of: a base station determining, on the basis of a determination condition related to the number of radio resource control connections, whether or not a switchover of a radio resource control state of a user equipment(s) is necessary; a user equipment reporting, to the base station, measured data of a first parameter of the user equipment in accordance with control signaling of the base station; the base station determining an accurate reference measurement threshold value with respect to the first parameter on the basis of the determination condition related to the number of radio resource control connections and the measured data of the first parameter, reported from the user equipment; and the user equipment (i) determining whether to carry out a switchover of a radio resource control state of that user equipment, on the basis of (a) the accurate reference measurement threshold value determined with respect to the first parameter, determined by the base station, (b) the measured data of the first parameter of that user equipment, and (c) a radio resource control state of that user equipment, and (ii) carrying out the switchover of the radio resource control state, in a case where that user equipment determines to carry out the switchover of the radio control state.

Further, the method of the present invention, for switching an RRC state, preferably further includes the steps of: the base station notifying, by control signaling, an approximate reference measurement threshold value determined with respect to a second parameter to the user equipment; and the user equipment determining whether to report the measured data of the first parameter on the basis of the approximate reference measurement threshold value determined with respect to the second parameter and the measured data of the second parameter of that user equipment.

Furthermore, in the method of the present invention, for switching an RRC state, either the first parameter or the second parameter preferably includes at least one of a reference signal received power, a channel quality indicator, and a path-loss.

Moreover, in the method of the present invention, for switching an RRC state, the first parameter to which the accurate reference measurement threshold value is determined and the second parameter to which the approximate reference measurement threshold value is determined are preferably with each other.

Further, in the method of the present invention, for switching an RRC state, the first parameter to which the accurate reference measurement threshold value is determined and the second parameter to which the approximate reference measurement threshold value is determined are preferably different from each other, the accurate reference measurement threshold value and the approximate reference measurement threshold value being determined independently.

BRIEF DESCRIPTION OF DRAWINGS

FIG. 1

FIG. 2

FIG. 3

FIG. 4

FIG. 5

FIG. 6

FIG. 7.

REFERENCE SIGNS LIST

104: eNB
1040: Sending/receiving unit

1041: Session determination unit
1042: Calculation unit
1044: Execution determination unit
1045: Approximate value determination unit
1046: Request unit
1048: Accurate value determination unit
1049: Releasing unit

DESCRIPTION OF EMBODIMENTS

An embodiment of the present invention is described in detail below with reference to drawings. For convenience, arrangements and functions unnecessary for explanation of the present invention are omitted here so that the present invention is easily understood.

The following description deals with specific examples, in each of which the present invention is applied to MBMS transmission of an LET cellular system, so that the present invention is understood in detail and clearly. As a matter of course, the present invention is not limited to this, and is therefore applicable to another communication system for providing MBMS.

FIG. 1 illustrates how an MBMS system defined by LTE is arranged. The MBMS system includes: an eBM-SC 101; an eBM-GW 102; an eNB 104; and a UE 105. The eBM-SC 101 is a service control center of the MBMS system. The eBM-GW 102 causes MBMS data to be sent by the IP multicast method to a corresponding one of the eNBs 104 in sync. The eNB 104 carries out scheduling of resources for single-cell MBMS transmission, and transmits the MBMS data. The UE 105 is a terminal device for receiving the MBMS data. FIG. 1 merely illustrates an example of the arrangement of the MBMS system. Note that such a specific restrictive arrangement is not necessarily required for implementation of a mobile communication system of the present invention.

As illustrated in FIG. 1, the MBMS system includes at least an eBM-SC 101, an eBM-GW 102, and an eNB 104. In a cell of the eNB 104, a plurality of UEs 105 which utilizes the MBMS (hereinafter, referred to as "MBMS•UE") are distributed. Each of the plurality of UEs 105 provides, via appropriate signaling, related information to the eNB 104.

Figure 2:
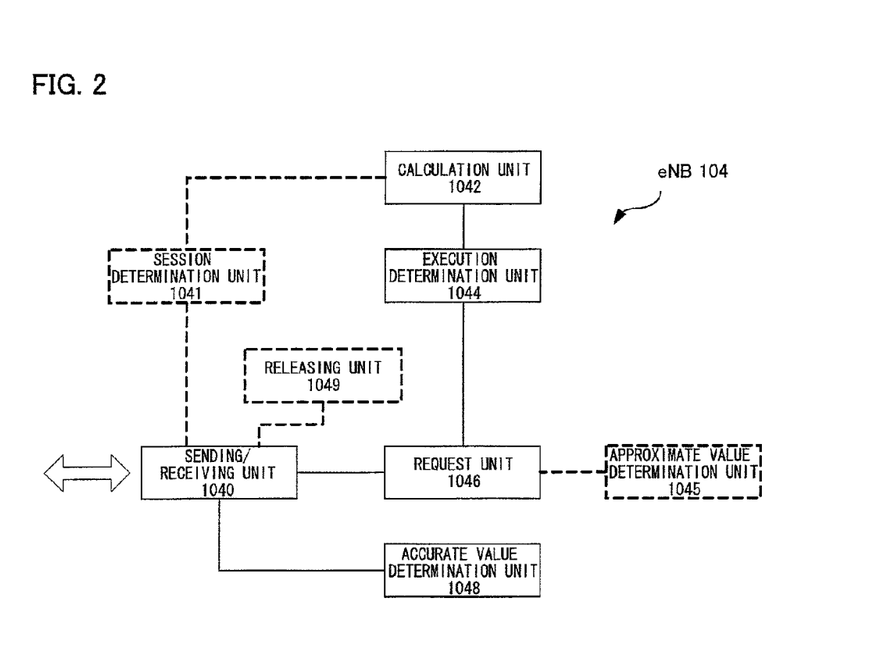
FIG. 2 is a block diagram illustrating an arrangement of an eNB 104 in accordance with one embodiment of the present invention.

The eNB 104 of the present invention has an arrangement illustrated in a block diagram of FIG. 2. Specifically, the eNB 104 includes: a sending/receiving unit 1040; a calculation unit 1042; an execution determination unit 1044; a request unit 1046; and an accurate value determination unit 1048. The sending/receiving unit 1040 carries out data communication with the MBMS•UEs in the cell of the eNB 104. The calculation unit 1042 calculates the number ($N_a = N_{max} - N_c$) of RRC connections currently available in the system, on the basis of (i) the number ($N_c$) of RRC connections currently established in the system and (ii) the maximum number ($N_{max}$) of RRC connections available in the system. The execution determination unit 1044 determines that a switchover of an RRC state of the MBMS•UE(s) is necessary in a case where the number ($N_a = N_{max} - N_c$) of RRC connections currently available in the system is smaller than a threshold ($N_{th}$) of the number of RRC connections, which threshold value is determined either previously or dynamically. In contrast, in a case where the execution determination unit 1044 determines that no switchover of an RRC state of the MBMS•UE(s) is necessary, the execution determination unit 1044 causes the calculation unit 1042 to be restarted after a predetermined period of time elapses. The request unit 1046 transmits, via the sending/receiving unit 1040, a request to report measurement to all of the MBMS•UEs in the cell, in a case where the execution determination unit 1044 determines that the switchover of the RRC state of the MBMS•UE(s) is necessary. The accurate value determination unit 1048 determines, on the basis of (i) the threshold value ($N_{th}$) of the number of RRC connections and (ii) data (including $P_r$) of a measured parameter, received from each of the MBMS•UEs via the sending/receiving unit 1040, an accurate reference measurement threshold value ($P_{rs}$) with respect to the parameter (hereinafter, referred to as "accurate reference measurement threshold value"), and transmits, via the sending/receiving unit 1040, the accurate reference measurement threshold value ($P_{rs}$) to all of the MBMS•UEs in the cell.

In the present invention, the parameter to which the accurate value determination unit 1048 determines the accurate reference measurement threshold value includes at least one of a reference signal received power (RSRP), a channel quality indicator (CQI), and a path-loss. In the following specific examples, the parameter is the reference signal received power (RSRP), as an example. As a matter of course, the present invention is not limited to the specific examples, and can be modified in various ways by a person skilled in the art. The parameter may be (i) the channel quality indicator (CQI), (ii) the path-loss, or (iii) any combination of the reference signal received power (RSRP), the channel quality indicator (CQI), and the path-loss, for example.

Further, as shown by a dotted line in FIG. 2, the eNB 104 further includes an approximate value determination unit 1045 for determining an approximate reference measurement threshold value ($P_{th}$) with respect to a parameter (hereinafter, referred to as "approximate reference measurement threshold value") by use of statistical data or a parameter of a static system. In this case, the request unit 1046 transmits, via the sending/receiving unit 1040, the approximate reference measurement threshold value ($P_{th}$) of the parameter to all of the MBMS•UEs in the cell. The parameter to which the approximate reference measurement threshold value ($P_{th}$) is determined by the approximate value determination unit 1045 and the parameter to which the accurate reference measurement threshold value ($P_{rs}$) is determined by the accurate value determination unit 1048 may be either identical with each other or different from each other.

Further, as shown by a dotted line in FIG. 2, the eNB 104 further includes a releasing unit 1049. In a case where the eNB 104 receives, via the sending/receiving unit 1040, an RRC connection establishment request from the MBMS•UE (which is being in the RRC idle state), the releasing unit 1049 (i) transmits, via the sending/receiving unit 1040, releasing information of an RRC connection to the MBMS•UE which transmitted the RRC connection establishment request, and simultaneously (ii) temporarily establish an RRC connection resource with the MBMS•UE and releases the RRC connection resource.

Moreover, as shown by a dotted line in FIG. 2, the eNB 104 furthermore includes a session determination unit 1041. The session determination unit 1041 determines whether or not an MBMS session is finished. In a case where the session determination unit 1041 determines that the MBMS session has not been finished, the session determination unit 1041 causes the calculation unit 1042 to be restarted after a predetermined period of time elapses. In contrast, in a case where the session determination unit 1041 determines that the session has been finished, the session determination unit 1041 finishes an entire process for the switchover of the RRC state, which entire process is carried out by the eNB 104.

Figure 3:
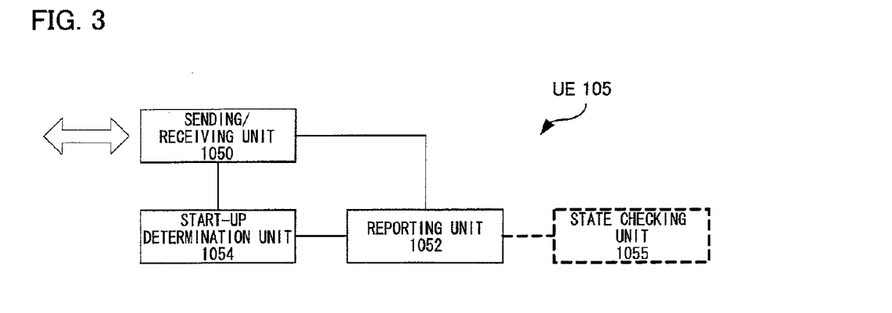
FIG. 3 is a block diagram illustrating an arrangement of a UE 105 in accordance with the embodiment of the present invention.

The UE 105 of the present invention has an arrangement illustrated in a block diagram of FIG. 3. Specifically, the UE 105 includes: a sending/receiving unit 1050; a reporting unit 1052; and a start-up determination unit 1054. The sending/ receiving unit 1050 carries out data communication with the eNB in the cell to which the UE 105 belongs. The reporting unit 1052 (i) measures a parameter of the UE 105 in response to a request to report measurement, which request is received, via the sending/receiving unit 1050, from the eNB in the cell to which the UE 105 belongs, and (ii) reports, via the sending/receiving unit 1050, data (including $P_r$) of the measured parameter to the eNB 104. The start-up determination unit 1054 determines whether to start the switchover of the RRC state of the UE 105, on the basis of (i) the accurate reference measurement threshold value ($P_{rs}$) of the parameter, received via the sending/receiving unit 1050 from the eNB 104 in the cell to which the UE 105 belongs, (ii) an actually-measured value of the parameter ($P_r$; received from the reporting unit 1052) of the UE 105 itself, and (iii) the RRC state of the UE 105 itself (the UE 105 is notified of its RRC state by the eNB 104 or by another method, and the RRC state is checked by a state checking unit 1055).

In the present invention, the parameter to which the accurate reference measurement threshold value is determined includes at least one of the reference signal received power (RSRP), the channel quality indicator (CQI), and the path-loss. In the following specific examples, the parameter is the reference signal received power (RSRP), as an example. As a matter of course, the present invention is not limited to the specific examples, and can be modified in various ways by a person skilled in the art. For example, the parameter can be (i) the channel quality indicator (CQI), (ii) the path-loss, or (iii) any combination of the reference signal received power (RSRP), the channel quality indicator (CQI), and the path-loss.

The reporting unit 1052 can determine whether to report the data (including $P_r$) of the measured parameter, on the basis of (i) the actually-measured value ($P_r$) of the parameter of the UE 105 itself, and (ii) the approximate reference measurement threshold value ($P_{th}$) of the parameter, received via the sending/receiving unit 1050 from the eNB in the cell to which the UE 105 belongs. In the same manner, the reporting unit 1052 can determine whether to report the data (including $P_r$) of the measured parameter, on the basis of (i) the actually-measured value ($P_r$) of the parameter of the UE 105 itself, and (ii) the accurate reference measurement threshold value ($P_{rs}$). The parameter to which the approximate reference measurement threshold value ($P_{th}$) is determined and the parameter to which the accurate reference measurement threshold value ($P_{rs}$) is determined can be either identical with each other or different from each other.

Moreover, as shown by a dotted line in FIG. 3, the UE 105 further includes the state checking unit 1055 for checking which one of the RRC connected state and the RRC idle state the UE 105 is being in. In a case where the state checking unit 1055 confirms that the UE 105 is being in the RRC connected state, the reporting unit 1052 directly reports the data (including $P_r$) of the measured parameter to the eNB 104 in response to the measurement report request. In contrast, in a case where the state checking unit 1055 confirms that the UE 105 is being in the RRC idle state, the reporting unit 1052 transmits, via the sending/receiving unit 1050, a random connection request to the eNB 104. Then, in a case where the reporting unit 1052 receives a random connection response via the sending/receiving unit 1050 from the eNB 104, the reporting unit 1052 can report, via the sending/receiving unit 1050, the data (including $P_r$) of the measured parameter to the eNB 104 by use of the RRC connection establishment request.

In the above descriptions, each of the arrangements of the eNB and the UE node of the present invention are explained as being constituted by specific unit modules with reference to FIGS. 2 and 3. Note, however, that the present invention is not limited to the specific unit modules, but can be realized as software, hardware, or their combination, by combining, dividing, or recombining a part or all of the unit modules.

The following description specifically deals with a method of the present invention, for switching an RRC state, with reference to FIGS. 2 through 7.

Figure 4:
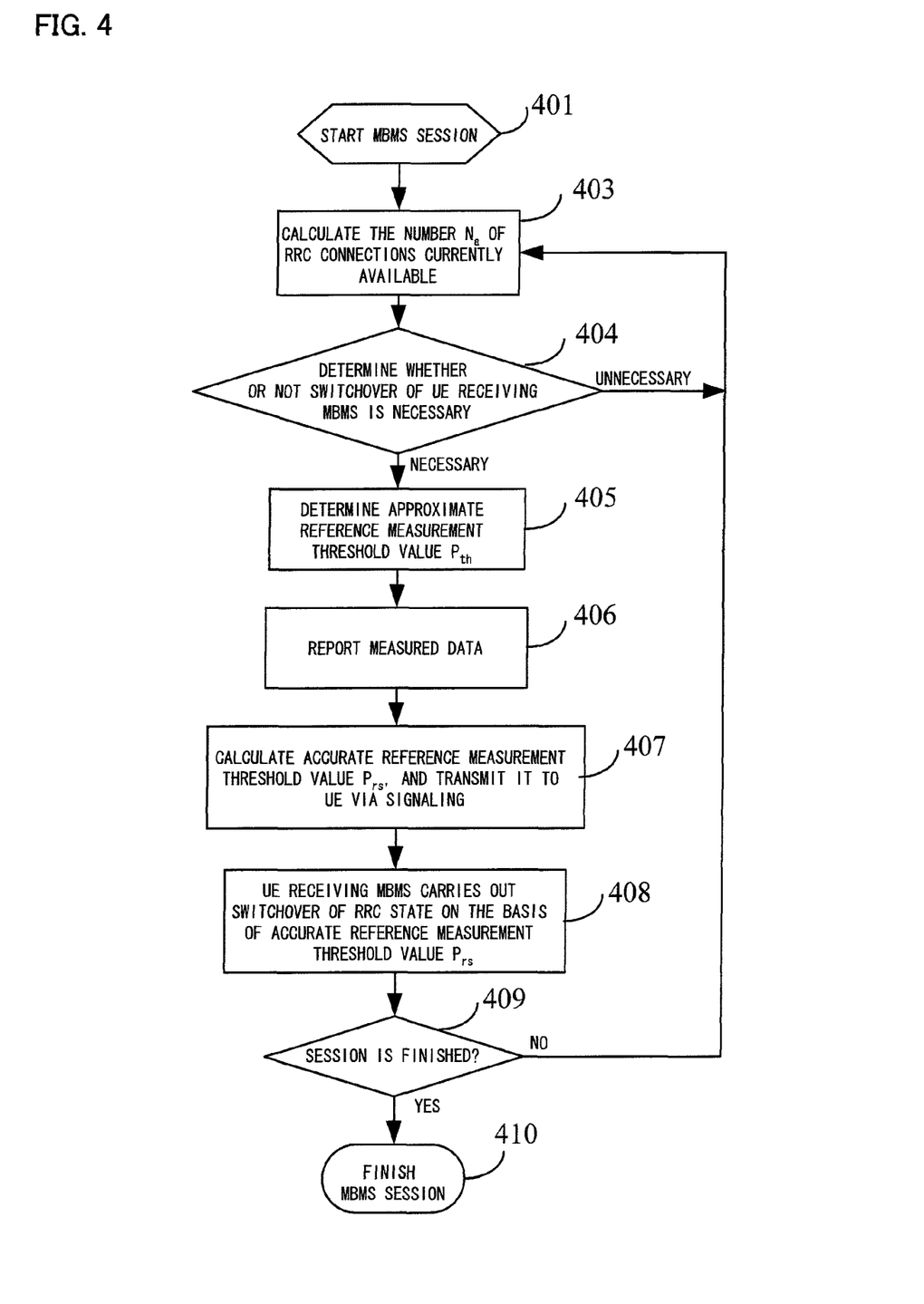
FIG. 4 is a flow chart showing a method for switching an RRC state, in accordance with First Example of the present invention.

FIG. 4 is a flowchart for explaining the method for switching an RRC state, in accordance with First Example of the present invention. A process flow of FIG. 4 is described in detail below.

In a case where the MBMS session is started (Step 401), the eNB 104 executes the following steps periodically.

The calculation unit 1042 of the eNB 104 calculates the number "$N_a=N_{max}-N_c$" of RRC connections currently available in the system on the basis of the number $N_c$ of RRC connections currently established in the system and the maximum number $N_{max}$ of RRC connections available in the system (Step 403).

The execution determination unit 1044 of the eNB 104 determines whether or not the switchover of the RRC state of the MBMS•UE(s) is necessary, in accordance with the number $N_a$ of RRC connections currently available in the system, calculated in Step 403 (Step 404). Specifically, the execution determination unit 1044 compares the number $N_a$ of RRC connections currently available in the system with the threshold value $N_{th}$ of the number of RRC connections, which threshold value $N_{th}$ is set either previously or dynamically. For example, in a case where the number $N_a$ of RRC connections currently available in the system is less than the threshold value $N_{th}$ of the number of RRC connections, i.e. $N_a<N_{th}$, the execution determination unit 1044 determines that the switchover of the RRC state of the MBMS•UE(s) is necessary. In contrast, in a case where the number $N_a$ of RRC connections currently available in the system is not less than the threshold value $N_{th}$ of the number of RRC connections, the execution determination unit 1044 determines that the switchover of the RRC state of the MBMS•UE(s) is not necessary. In the case where the execution determination unit 1044 determines that the switchover of the RRC state of the MBMS•UE(s) is not necessary, no operation is carried out until the next cycle and then Step 403 is carried out again. In the case where the switchover of the RCC state of the MBMS•UE(s) is necessary, the process proceeds to the following Step 405.

The approximate value determination unit 1045 of the eNB 104 sets the approximate reference measurement threshold value $P_{th}$ with respect to a parameter, on the basis of statistical data of the system or data set in advance (Step 405). The setting of the approximate reference measurement threshold value $P_{th}$ of the parameter makes it possible to limit the number of the MBMS•UEs which report their measurement data, so as to reduce signaling overhead of the system. In the present example, a reference value $P_{th}$ of the reference signal received power (RSRP) is selected and set as the approximate reference measurement threshold value $P_{th}$. The approximate reference measurement threshold value $P_{th}$ can be set (i) statically by a parameter of the system, (ii) statistically based on the measurement data reported in the previous cycle, or (iii) by adopting both of (i) and (ii). In an actual application system, the approximate reference measurement threshold value $P_{th}$ can be a threshold value of the channel quality indicator (CQI) or a threshold value of the path-loss.

The request unit 1046 of the eNB 104 transmits, on an MCCH channel, the measurement report request and the approximate reference measurement threshold value $P_{th}$ of the parameter, determined in Step 405, to all of the MBMS•UEs 105 in the cell of the eNB 104. The transmission of the measurement report request and the approximate reference measurement threshold value $P_{th}$ functions as a trigger for starting up a measurement data report process of the MBMS•UEs (Step 406).

Figure 5:
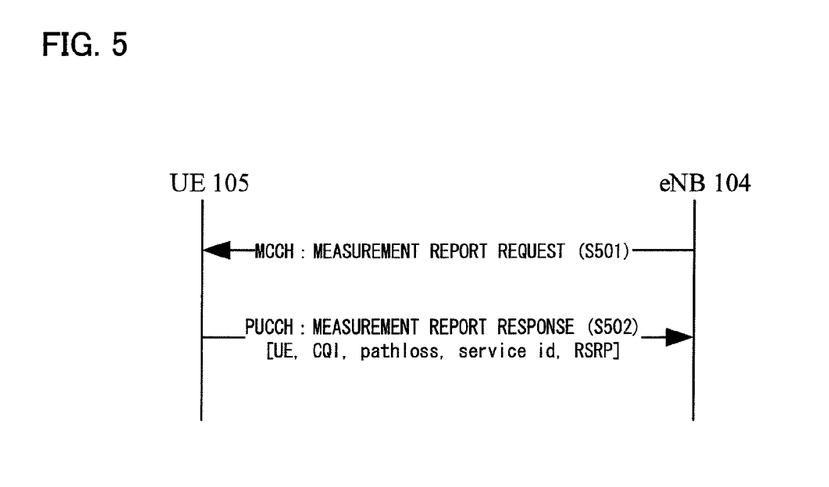
FIG. 5 is a view showing a process for reporting measurement data of an MBMS·UE which is being in an RRC connected state.

FIG. 5 is a view showing the measurement data report process of the MBMS•UE which is being in the RRC connected state. First, in Step 501, the MBMS•UE 105 which is being in the RRC connected state receives, from the eNB 104, the measurement report request and the approximate reference measurement threshold value $P_{th}$ of the parameter (the MBMS•UE 105 is notified of its RRC state by the eNB 104 or by another method, and the RRC state is checked by a state checking unit 1055). On the reception of these, the MBMS•UE 105 compares the approximate reference measurement threshold value $P_{th}$ with the reference value $P_r$ of the reference signal received power (RSRP) measured and selected by the reporting unit 1052. In a case where a result of the comparison is $P_r<P_{th}$, the process proceeds to Step 502. Next, in Step 502, the reporting unit 1052 of the MBMS•UE 105 reports, on a PUCCH channel which has been assigned in advance, response information of the measurement report, which response information includes an ID of the UE, an ID of the MBMS, and the reference signal received power (RSRP) $P_r$. As a matter of course, the response information of the measurement report is not limited to the one described above, and can be the channel quality indicator (CQI), the path-loss, or such response information that the above response information includes at least one of the channel quality indicator (CQI) and the path-loss.

Figure 6:
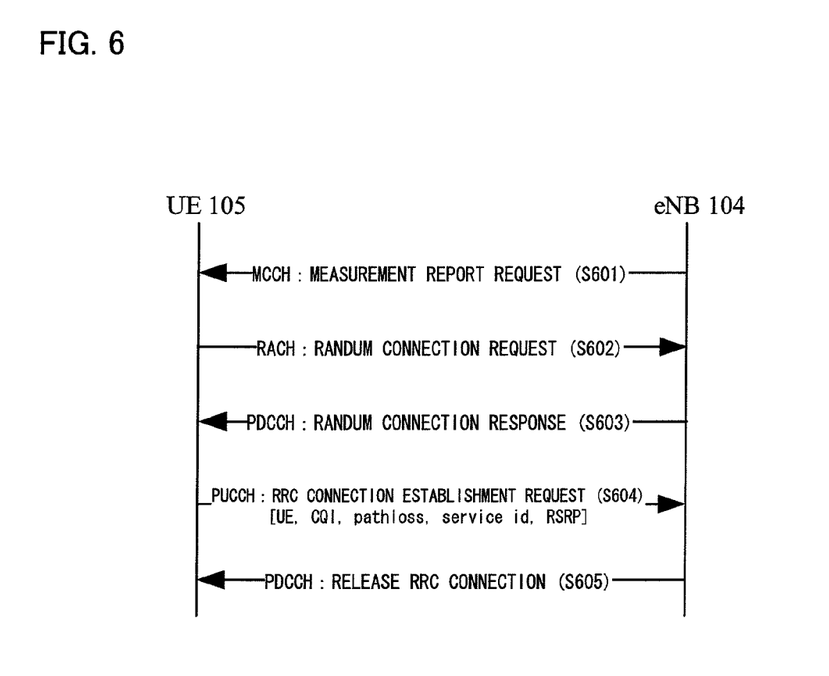
FIG. 6 is a view showing a process for reporting measurement data of an MBMS·UE which is being in an RRC idle state.

FIG. 6 is a view showing the measurement data report process of the MBMS•UE which is being in the RRC idle state. In Step 601, the MBMS•UE 105 which is being in the RRC idle state receives, from the eNB 104, the measurement report request and the approximate reference measurement threshold value $P_{th}$ (the MBMS•UE 105 is notified of its RRC state by the eNB 104 or by another method, and the RRC state is checked by a state checking unit 1055). Then, the MBMS•UE 105 compares the approximate reference measurement threshold value $P_{th}$ with the reference value $P_r$ of the reference signal received power (RSRP) measured and selected by the reporting unit 1052. In a case where a result of the comparison is $P_r<P_{th}$, the process proceeds to Step 602. In Step 602, the reporting unit 1052 of the MBMS•UE 105 transmits, on an RACH channel, a random connection request to the eNB 104. Next, in Step 603, the eNB 104 transmits the random connection response to the MBMS•UE 105 to which the eNB 104 established a random connection. In Step 604, the reporting unit 1052 of the MBMS•UE 105 transmits, to the eNB 104, information of an RRC connection establishment request, which information includes the ID of the UE, the ID of the MBMS, and the reference value $P_r$ of the reference signal received power (RSRP). As a matter of course, the information of the RRC connection establishment request is not limited to the one described above, and can be the channel quality indicator (CQI), the path-loss, or such information that the information described above includes at least one of the channel quality indicator (CQI) and the path-loss. In Step 605, the releasing unit 1049 of the eNB 104 transmits information of a released connection to the MBMS•UE 105 on the reception of the information of the RRC connection establishment request, and simultaneously temporarily establishes an RRC connection resource with the MBMS•UE 105 and releases the RRC connection resource.

Then, the accurate value determination unit 1048 of the eNB 104 calculates the accurate reference measurement threshold value $P_{rs}$, on the basis of (i) the measurement data (the ID of the UE, the ID of the MBMS, and the reference value $P_r$ of the reference signal received power) reported by the MBMS•UE in Step 406 and (ii) the number $N_a$ of RRC connections currently available in the system, calculated in Step 403 (Step 407). The parameter to which the accurate reference measurement threshold value $P_{rs}$ is determined in Step 407 can be identical with the parameter to which the approximate reference measurement threshold value $P_{th}$ is determined in Step 405 (the reference signal received power in the present example) or different from the parameter to which the approximate reference measurement threshold value $P_{th}$ is determined (the channel quality indicator or the path-loss, for example). For example, among the UEs reporting the measurement data, the number of the MBMS•UEs which are being in the RRC connected state is assumed to be $N_s$. First, RSRP values of all of the MBMS•UEs that have reported their measurement data are ordered from the lowest RSRP value to the highest RSRP value. Next, among the ordered RSRP values, the "$N_s+N_{max}-N_c-N_{th}$"th RSRP value $P_{rs}$ is selected as the accurate reference measurement threshold value $P_{rs}$. After that, the accurate value determination unit 1048 of the eNB 104 transmits, on the MCCH channel, the accurate reference measurement threshold value $P_{rs}$ to all of the MBMS•UEs in the cell of the eNB 104. With the operation described above, the accurate reference measurement threshold value $P_{rs}$ enables to make sure that the number of UEs (including the MBMS•UEs and non-MBMS•UEs) in the system, which UEs are turned to the RRC connected state, falls within a predetermined range of "$N_{max}$ (the maximum number of RRC connections in the system)-$N_{th}$".

The start-up determination unit 1054 of the MBMS•UE 105 carries out the switchover of the RRC state in accordance with the accurate reference measurement threshold value $P_{rs}$ thus received (Step 408). The start-up determination unit 1054 determines whether or not the switchover of the RRC state of the MBMS•UE 105 is necessary, on the basis of (i) a relationship between the accurate reference measurement threshold value $P_{rs}$ and the actually measured value $P_r$ of the MBMS•UE 105 and (ii) the current RRC state of the MBMS•UE 105.

For example, in a case where the $P_r$ is equal to or less than the $P_{rs}$ ($P_r \leq P_{rs}$) and the MBMS•UE 105 is being in the RRC idle state, the start-up determination unit 1054 starts up an RRC connection establishment process.

Further, in a case where the $P_r$ is equal to or less than the $P_{rs}$ ($P_r \leq P_{rs}$), and the MBMS•UE 105 is being in the RRC connected state, the start-up determination unit 1054 carries out no operation.

Furthermore, in a case where the $P_r$ is more than the $P_{rs}$ ($P_r > P_{rs}$), and the MBMS•UE 105 is being in the RRC connected state, the start-up determination unit 1054 starts up an RRC connection releasing process.

Moreover, in a case where the $P_r$ is more than the $P_{rs}$ ($P_r > P_{rs}$), and the MBMS•UE 105 is being in the RRC idle state, the start-up determination unit 1054 carries out no operation.

Next, the session determination unit 1041 of the eNB 104 determines whether or not the session has been finished. In a case where the MBMS session has not been finished, no operation is carried out until the next cycle, and then Step 403 is executed again (Step 409).

In a case where the MBMS session has been finished, the aforementioned flow is finished (Step 410).

Figure 7:
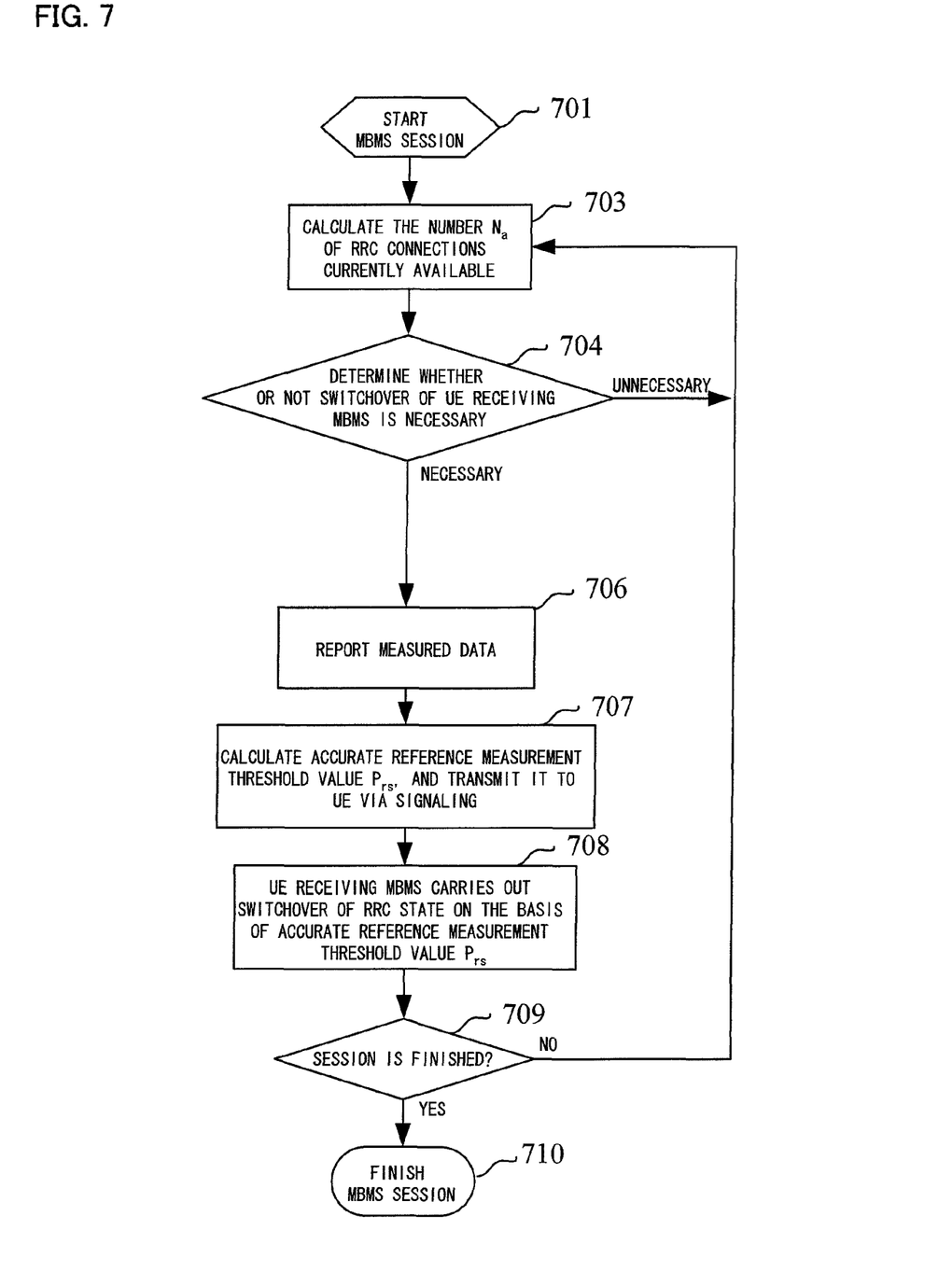
FIG. 7 is a flow chart showing a method for switching the RRC state, in accordance with Second Example of the present invention.

FIG. 7 is a flow chart showing a method for switching an RRC state in accordance with Second Example of the present invention. The following description specifically deals with a flow of FIG. 7 in detail.

In a case where the MBMS session is started (Step 701), the eNB 104 carries out the following steps periodically.

The calculation unit 1042 of the eNB 104 calculates the number "$N_a=N_{max}-N_c$" of RRC connections currently available on the basis of the number $N_c$ of RRC connections currently established in the system and the maximum number $N_{max}$ of RRC connections available in the system (Step 703).

The execution determination unit 1044 of the eNB 104 determines whether or not the switchover of the RRC state of the MBMS•UE(s) is necessary, in accordance with the number $N_a$ of RRC connections currently available in the system, calculated in Step 703 (Step 704). Specifically, the execution determination unit 1044 compares the number $N_a$ of RRC connections currently available in the system with the threshold value $N_{th}$ of the number RRC connections. For example, in a case where the number $N_a$ of RRC connections currently available in the system is less than the threshold value $N_{th}$ of the number of RRC connections, i.e. $N_a<N_{th}$, the execution determination unit 1044 determines that the switchover of the RRC state of the MBMS•UE(s) is necessary. In contrast, in a case where the number $N_a$ of RRC connections currently available in the system is not less than the threshold value $N_{th}$ of the number of RRC connections, the execution determination unit 1044 determines that the switchover of the RRC state of the MBMS•UE(s) is not necessary. In the case where the execution determination unit 1044 determines that the switchover of the RRC state of the MBMS•UE(s) is not necessary, no operation is carried out until the next cycle, and then Step 703 is carried out again. In the case where the execution determination unit 1044 determines that the switchover of the RRC state of the MBMS•UEs is necessary, the process proceeds to the following Step 706.

The request unit 1046 of the eNB 104 transmits, on the MCCH channel, the measurement report request to all of the MBMS•UEs 105 in the cell of the eNB 104, so as to induce the MBMS•UEs 105 to carry out the measurement data report process (Step 706).

The measurement data report process of the MBMS•UE which is being in the RRC connected state is carried out in the same manner as shown in FIG. 5. First, in Step 501, the MBMS•UE 105 which is being in the RRC connected state receives the measurement report request from the eNB 104 (the MBMS•UE 105 is notified of its RRC state by the eNB 104 or by another method, and the RRC state is checked by a state checking unit 1055). Next, in Step 502, the reporting unit 1052 of the MBMS•UE 105 reports, on the PUCCH channel which has been assigned in advance, response information of the measurement report, which response information includes the ID of the UE, the ID of the MBMS, and the reference value $P_r$ of the reference signal received power (RSRP). As a matter of course, the response information of the measurement report is not limited to the one described above, and can be the channel quality indicator (CQI), the path-loss, or such information that the response information described above includes at least one of the channel quality indicator (CQI) and the path-loss.

The measurement data report process of the MBMS•UE which is being in the RRC idle state is carried out in the same manner as shown in FIG. 6. In Step 601, the MBMS•UE 105 which is being in the RRC idle state receives the measurement report request from the eNB 104 (the MBMS•UE 105 is notified of its RRC state by the eNB 104 or by another method, and the RRC state is checked by a state checking unit 1055). In Step 602, the reporting unit 1052 of the MBMS•UE 105 transmits, on the RACH channel, a random connection request to the eNB 104. Next, in Step 603, the eNB 104 transmits a random connection response to the MBMS•UE 105 to which the eNB 104 established a random connection. In Step 604, the reporting unit 1052 of the MBMS•UE 105 transmits, to the eNB 104, information of an RRC connection establishment request, which information includes the ID of the UE, the ID of the MBMS, and the reference value $P_r$ of the reference signal received power (RSRP). As a matter of course, the information of the RRC connection establishment request is not limited to the one described above, and can be the channel quality indicator (CQI), the path-loss, or such information that the information described above includes at least one of the channel quality indicator (CQI) and the path-loss. Then, in Step 605, on the reception of the information of the RRC connection establishment request, the releasing unit 1049 of the eNB 104 transmits, to the MBMS•UE 105, information of a released connection, and simultaneously, temporarily establishes an RRC connection resource with the MBMS•UE 105 and releases the RRC connection resource.

Next, the accurate value determination unit 1048 of the eNB 104 calculates the accurate reference measurement threshold value $P_{rs}$ on the basis of (i) the measurement data (the ID of the UE, the ID of the MBMS, and the reference value $P_r$ of the reference signal received power) reported from each of the MBMS•UEs in Step 706 and (ii) the number $N_a$ of RRC connections currently available in the system, calculated in Step 703 (Step 707). For example, among the UEs reporting the measurement data, the number of the MBMS•UEs which are being in the RRC connected state is assumed to be $N_s$. First, RSRP values of all of the MBMS•UEs that have reported their measurement data are ordered from the lowest RSRP value to the highest RSRP value. Next, among the ordered RSRP values, the "$N_s+N_{max}-N_c-N_{th}$"th RSRP reference value $P_{rs}$ is selected as the accurate reference measurement threshold value $P_{rs}$. In the present example, the accurate reference measurement threshold value $P_{rs}$ is set with respect to the reference signal received power (RSRP). Note, however, that the accurate reference measurement threshold value $P_{rs}$ can be set with respect to the channel quality indicator (CQI) or the path-loss. Next, the accurate value determination unit 1048 of the eNB 104 transmits, on the MCCH channel, the accurate reference measurement threshold value $P_{rs}$ to all of the MBMS•UEs in the cell of the eNB 104. With the operation described above, the accurate reference measurement threshold value $P_{rs}$ enables to make sure that the number of the UEs (including the MBMS•UEs and non-MBMS•UEs) in the system, which UEs are being in the RRC connected state, falls within a predetermined range of "$N_{max}$ (maximum number of RRC connections available in the system)$-N_{th}$".

The start-up determination unit 1054 of the MBMS•UE 105 carries out the switchover of the RRC state of the MBMS•UE 105 in accordance with the accurate reference measurement threshold value $P_{rs}$ thus received (Step 708). The start-up determination unit 1054 determines whether or not the switchover of the RRC state of the MBMS•UE 105 is necessary, on the basis of (i) a relationship between the accurate reference measurement threshold value $P_{rs}$ and the actually-measured value $P_r$ of the MBMS•UE and (ii) the current RRC state of the MBMS•UE 105.

For example, in a case where the $P_r$ is equal to or less than the $P_{rs}$ ($P_r \leq P_{rs}$), and the MBMS•UE 105 is being in the RRC idle state, the start-up determination unit 1054 starts up the RRC connection establishment process.

Further, in a case where the $P_r$ is equal to or less than the $P_{rs}$ ($P_r \leq P_{rs}$), and the MBMS•UE 105 is being in the RRC connected state, the start-up determination unit 1054 carries out no operation.

Furthermore, in a case where the $P_r$ is more than the $P_{rs}$ ($P_r>P_{rs}$), and the MBMS•UE 105 is being in the RRC connected state, the start-up determination unit 1054 carries out the RRC connection releasing process.

Moreover, in a case where the $P_r$ is more than the $P_{rs}$ ($P_r>P_{rs}$), and the MBMS•UE 105 is being in the RRC idle state, the start-up determination unit 1054 carries out no operation.

Next, the session determination unit 1041 of the eNB 104 determines whether or not the session has been finished. In a case where the session determination unit 1041 determines that the MBMS session has not been finished, no operation is carried out until the next cycle, and then Step 703 is carried out again (Step 709).

In a case where the MBMS session has been finished, the aforementioned flow is finished (Step 710).

First Example of the present invention includes Step 405 while Second Example of the present invention does not include Step 405. That is, in First Example, the approximate reference measurement threshold value $P_{th}$ of the parameter is determined before the accurate reference measurement threshold value is determined, in accordance with the statistical data of the system or the parameter of the static system. The determination of the approximate reference measurement threshold value $P_{th}$ makes it possible to limit the number of the MBMS•UEs that report their measurement data, so as to reduce the signaling overhead of the system. Note, however, that Step 405 is not necessarily carried out, and the present invention can be realized in accordance with Second Example of the present invention. That is, it is possible to cause all the MBMS•UEs to carry out the measurement data report process, without taking the signaling overhead into consideration.

As described above, according to the present invention, among user equipments in an accessible area of a system, part of user equipments having bad channel quality can be turned to an RRC connected state, so as to conveniently feed back link information, and a base station can enhance quality of service (QoS) of the part of user equipments by use of mechanisms such as adoptive modulation and coding, or hybrid automatic repeat request (HARQ). Such a signaling mechanism can be used easily and effectively, and can secure a high quality service for a user equipment receiving MBMS, without influencing a unicast service.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The present invention is applicable to any radio communication system in which a base station and a plurality of mobile terminals (user equipment) are communicable with each other via radio communication.

The invention claimed is:

1. A base station comprising:
  a sending/receiving unit for carrying out data communication with one or more user equipments in a cell, the one or more user equipments receiving Multimedia Broadcast Multicast Service;
  a calculation unit for calculating the number of radio resource control connections currently available in a system;
  an execution determination unit for determining whether or not a switchover of a radio resource control state of a user equipment(s) among the one or more user equipments is necessary, on the basis of the number of radio resource control connections currently available in the system and a threshold value of the number of radio resource control connections;
  a request unit for transmitting, via the sending/receiving unit, a request to report measurement of a first parameter to all of the one or more user equipments in the cell, in a case where the execution determination unit determines that the switchover of the radio resource control state of the user equipment(s) is necessary;
  an accurate value determination unit for (i) determining an accurate reference measurement threshold value with respect to the first parameter on the basis of the threshold value of the number of radio resource control connections and data of the measured first parameter, received from each of the one or more user equipments via the sending/receiving unit, and (ii) transmitting, via the sending/receiving unit, the accurate reference measurement threshold value to all of the one or more user equipments in the cell.

2. The base station as set forth in claim 1, further comprising:
  an approximate value determination unit for determining an approximate reference measurement threshold value with respect to a second parameter on the basis of statistical data or a parameter of a static system,
  the request unit transmitting, via the sending/receiving unit, the approximate reference measurement threshold value to all of the one or more user equipments in the cell.

3. The base station as set forth in claim 1, further comprising:
  a releasing unit for, in a case where the base station receives, via the sending/receiving unit, a request for a radio resource control connection from a user equipment among the one or more user equipments, (i) transmitting releasing information of the radio resource control connection to the user equipment from which the request for the radio resource control connection is received, and simultaneously (ii) temporarily establishing a radio resource control connection with the user equipment, and releasing the radio resource control connection with the user equipment.

4. A user equipment comprising:
  a sending/receiving unit for carrying out data communication with a base station in a cell to which the user equipment belongs;
  a reporting unit for (i) measuring a first parameter of the user equipment in response to a request to report measurement of the first parameter, which request is received from the base station via the sending/receiving unit, and (ii) reporting, to the base station via the sending/receiving unit, data of the first parameter thus measured; and
  a start-up determination unit for determining whether to switch over a radio resource control state of the user equipment, on the basis of (a) an accurate reference measurement threshold value determined with respect to the first parameter, received from the base station via the sending/receiving unit, (b) a value of the first parameter of the user equipment, measured by the reporting unit, and (c) the radio resource control state of the user equipment.

5. The user equipment as set forth in claim 4, wherein:
the reporting unit determines whether to report, to the base station, the data of the first parameter measured by the reporting unit, on the basis of (a) an approximate reference measurement threshold value determined with respect to a second parameter, received from the base station via the sending/receiving unit and (b) a value of the second parameter of the user equipment, measured by the reporting unit.

6. The user equipment as set forth in claim 4, further comprising:
a state checking unit for checking which one of a radio resource control connected state and a radio resource control idle state the user equipment is being in,
the reporting unit reporting, to the base station, the data of the first parameter thus measured in response to the request to report measurement of the first parameter in a case where the state checking unit confirms that the user equipment is being in the radio resource control connected state, and
the reporting unit transmitting, to the base station via the sending/receiving unit, a random connection request in response to the request to report measurement of the first parameter in a case where the state checking unit confirms that the user equipment is being in the radio resource control idle state, and the reporting unit reporting, to the base station via the sending/receiving unit, by use of a radio resource control connection establishment request, the data of the first parameter thus measured, in a case where the reporting unit receives, via the sending/receiving unit, a random connection response.

7. A method for switching a radio resource control state, the method comprising the steps of:
(I) calculating the number of radio resource control connections currently available in a system;
(II) determining, on the basis of the number of radio resource control connections currently available in the system and a threshold value of radio resource control connections, whether or not a switchover of a radio resource control state of a user equipment(s) among one or more user equipments in a cell is necessary, which one or more user equipments receive Multimedia Broadcast Multicast Service;
(III) transmitting a request to report measurement of a first parameter to all of the one or more user equipments in a cell, in a case where it is determined that the switchover of the radio resource control state of the user equipment(s) is necessary;
(IV) each of the one or more user equipments measuring the first parameter of that user equipment in response to the request to report measurement of the first parameter which is thus received and reporting data of the first parameter thus measured;
(V) determining an accurate reference measurement threshold value with respect to the first parameter on the basis of the threshold value of radio resource control connections and the data of the first parameter thus reported, and transmitting the accurate reference measurement threshold value to all of the one or more user equipments in the cell; and
(VI) each of the one or more user equipments determining whether to carry out a switchover of a radio resource control state of that user equipment on the basis of (a) the accurate reference measurement threshold value determined with respect to the first parameter, transmitted in the step of (V), (b) a value of the first parameter of that user equipment, measured in the step of (IV), and (c) a radio resource control state of that user equipment.

8. The method as set forth in claim 7, the method further comprising the step of:
(VII) determining an approximate reference measurement threshold value with respect to a second parameter on the basis of statistical data or a parameter of a static system,
the step of (III) including transmitting the approximate reference measurement threshold value to all of the one or more user equipments,
the step of (IV) including each of the one or more user equipments determining whether to report the data of the first parameter measured in the step of (IV), on the basis of (a) the approximate reference measurement threshold value transmitted to said all of the one or more user equipments, and (b) a value of the second parameter of that user equipment, measured in the step of (IV).

9. The method as set forth in claim 7, wherein:
in the step of (IV), a user equipment being in a radio resource control connected state among the one or more user equipments directly reports the data of the first parameter thus measured, in response to the request to report measurement of the first parameter.

10. The method as set forth in claim 7, wherein:
in the step of (IV), a user equipment being in a radio resource control idle state among the one or more user equipments transmits a random connection request in response to the request to report measurement of the first parameter; and
in a case where that user equipment receives a random connection response, that user equipment reports the data of the first parameter thus measured, by use of a radio resource control connection establishment request.

11. The method as set forth in claim 10, further comprising the step of:
(VIII) after receiving the radio resource control connection establishment request from the user equipment, (i) transmitting releasing information of a radio resource control connection to the user equipment and simultaneously (ii) temporarily establishing a resource of a radio resource control connection with the user equipment and releasing the resource of the radio resource control connection with the user equipment.

12. A method for switching a radio resource control state, the method further comprising the steps of:
a base station determining, on the basis of a determination condition related to the number of radio resource control connections, whether or not a switchover of a radio resource control state of a user equipment(s) is necessary;
a user equipment reporting, to the base station, measured data of a first parameter of the user equipment in accordance with control signaling of the base station;
the base station determining and notifying to the user equipment an accurate reference measurement threshold value with respect to the first parameter on the basis of the determination condition related to the number of radio resource control connections and the measured data of the first parameter, reported from the user equipment; and
the user equipment (i) determining whether to carry out a switchover of a radio resource control state of that user equipment, on the basis of (a) the accurate reference measurement threshold value determined with respect to the first parameter, determined by the base station, (b)

the measured data of the first parameter of that user equipment, and (c) a radio resource control state of that user equipment, and (ii) carrying out the switchover of the radio resource control state, in a case where that user equipment determines to carry out the switchover of the radio control state.

13. The method as set forth in claim 12, the method further comprising the steps of:

the base station notifying, by control signaling, an approximate reference measurement threshold value determined with respect to a second parameter to the user equipment; and the user equipment determining whether to report the measured data of the first parameter on the basis of the approximate reference measurement threshold value determined with respect to the second parameter and the measured data of the second parameter of that user equipment.

* * * * *